L. CHAPMAN.
Lawn Mower.

No. 98,348.

Patented Dec. 28, 1869.

Witnesses:
Edwin E. Marvin
William S. Shipman

Inventor:
Luke Chapman
By
Ellis & Simonds
Attys

UNITED STATES PATENT OFFICE.

LUKE CHAPMAN, OF COLLINSVILLE, CONNECTICUT, ASSIGNOR TO HIMSELF AND THE COLLINS COMPANY, OF SAME PLACE.

IMPROVEMENT IN LAWN-MOWERS.

Specification forming part of Letters Patent No. 98,348, dated December 28, 1869.

*To all whom it may concern:*

Be it known that I, LUKE CHAPMAN, of Collinsville, in the county of Hartford and State of Connecticut, have invented a new and useful Improved Lawn-Mower; and I declare the following to be a full and exact description thereof, reference being had to the accompanying drawings, and to the letters of reference thereon, forming a part of this specification.

Figure 1:
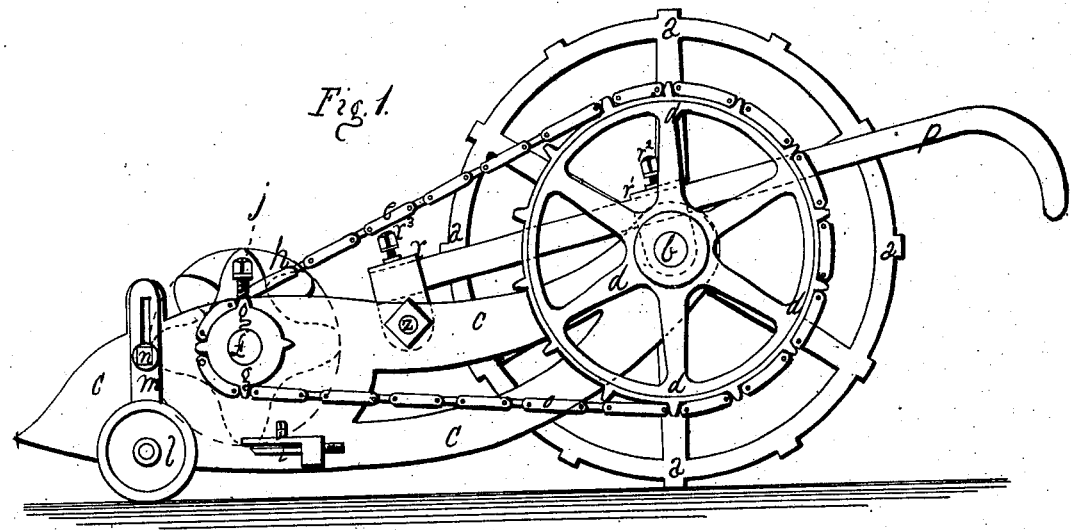
Figure 3:
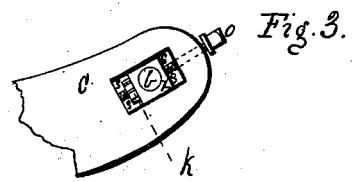
Figure 2:
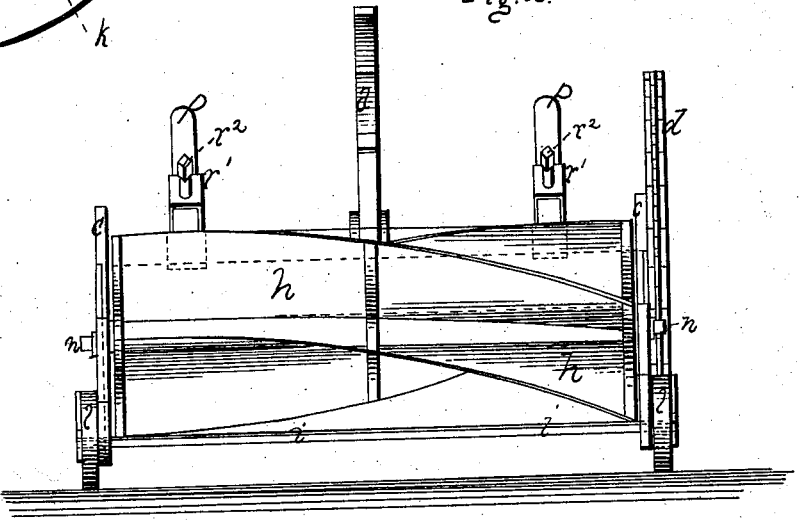

Figure 1 is a side elevation. Fig. 2 is an end elevation. Fig. 3 is a detached view, showing the boxes which support the driving-shaft.

Like letters indicate like parts in all the drawings.

The letter $a$ designates the driving-wheel, fastened rigidly to the shaft $b$, which is hung in two boxes or bearings in the ends of the frame $c$. Just outside the frame, upon one end of the shaft $b$, is fastened the toothed wheel $d$. The teeth on this wheel are double, and project from the periphery of the wheel at regular intervals. In saying that these teeth are double, I mean that each tooth is sawn down through its center, so as to leave a narrow unbroken path around the center of the periphery of the wheel. On this wheel runs an endless metal chain, made of alternate pieces or links, of single and double thickness. The pieces of double thickness just fit lengthwise between the double teeth, and the pieces of single thickness just fit down into the groove sawn in the center of the teeth. This endless chain also runs upon, and drives with a positive motion, the toothed pinion $g$, whose periphery is made in the same manner as that of the toothed wheel $d$. The alternate pieces or links composing the chain are, of course, pivoted to each other. The toothed pinion is fastened to and drives the shaft $f$, which is hung upon two boxes or bearings in the frame $c$, and upon which is constructed and fastened the revolving cutter $h$, which has curved blades, more or less in number, as is desired. Under the revolving cutter $h$ is the straight horizontal cutter-bar $i$, made adjustable vertically and horizontally. Against the edge of this cutter-bar the blades of the revolving cutters press the grass and cut it off.

The revolving cutter $h$ is made adjustable vertically by means of boxes and regulating-screws, one of which, $j$, is seen in Fig. 1, the whole being done in precisely the same manner as the shaft $b$ is made adjustable, shown in Fig. 3, and hereinafter described.

When the position of the shaft $f$ is changed, it is obvious that the distance between it and shaft $b$ must always be kept the same, in order to keep the chain $e$ taut.

The shaft $b$ is made adjustable by duplicates of the device shown in Fig. 3.

$b$ is the shaft, and $x$ is its box, of which there is one upon each of the two bearings of the shaft. This box just slides in the slot $s$. It has a flange upon the inside, which fits against the inside of the frame and slides upon it. The shaft $b$ has a shoulder, which fits up against the box $x$ on the inside, and thus holds it from dropping out of the slot. The letter $o$ designates a screw, which bears against the box on one side, and $k$ is a screw bearing against the box upon the opposite side. The head of the screw $k$ has either slots or holes in it, for the purpose of turning it with an appropriate wrench-bar.

It will be readily understood that by means of these regulating-screws the box $x$ can be moved in the slot, and the shaft adjusted as desired.

On the front part of the frame $c$ are duplicate rollers $l\ l$, hung upon the sliding bars $m$, by means of which, and the set-screws $n\ n$, the rollers can be set at any desired height. The letters $p\ p$ designate the handles of the machine. They pass through the duplicate sockets $r\ r$, also through the duplicate sockets $r^1\ r^1$, and are made adjustable lengthwise in them by means of the set-screws $r^2\ r^2$ and $r^3\ r^3$. The duplicate sockets $r$ are fitted upon the round bar $z$, but are not fastened to it. The duplicate sockets $r^1\ r^1$ are fitted in the same manner upon the round shaft $b$.

The width of the handles apart can be made more or less by sliding the sockets upon the bar $z$ and shaft $b$.

The handles can be raised by throwing the sockets *r* down below the bar *z*, instead of above it, as shown in the drawing.

What I claim as my invention, and desire to secure by Letters Patent, is—

The combination of the handles *p p*, attached to the shafts by adjustable sockets *r* and *r*¹, the shaft *b*, with its adjustable bearing *x x*, the toothed wheels *d* and *g*, and endless chain *e*, all constructed and arranged substantially as described.

Dated the 15th day of June, 1869.

LUKE CHAPMAN.

Witnesses:
W. E. SIMONDS,
W. J. WOOD.